United States Patent
Huesemann

(10) Patent No.: US 8,522,502 B2
(45) Date of Patent: Sep. 3, 2013

(54) POLE CONSTRUCTION FOR FRAMEWORK TOWERS OF WIND POWER PLANTS

(75) Inventor: Klaus Huesemann, Stemwede (DE)

(73) Assignee: Rautaruukki Oyj, Vantaa (FI)

( * ) Notice: Subject to any disclaimer, the term of this patent is extended or adjusted under 35 U.S.C. 154(b) by 54 days.

(21) Appl. No.: 12/674,738

(22) PCT Filed: Aug. 22, 2008

(86) PCT No.: PCT/EP2008/006960
§ 371 (c)(1),
(2), (4) Date: Jan. 11, 2011

(87) PCT Pub. No.: WO2009/024356
PCT Pub. Date: Feb. 26, 2009

(65) Prior Publication Data
US 2011/0094180 A1  Apr. 28, 2011

(30) Foreign Application Priority Data
Aug. 23, 2007  (DE) .................. 10 2007 039 957

(51) Int. Cl.
*E04H 12/00*  (2006.01)
*E04H 12/34*  (2006.01)
*E04C 3/00*  (2006.01)

(52) U.S. Cl.
USPC ........................... 52/651.01; 52/846; 52/263

(58) Field of Classification Search
USPC ..... 52/652.1, 653.1, 843–846, 651.01–651.1; D25/126
See application file for complete search history.

(56) References Cited

U.S. PATENT DOCUMENTS

| | | | | |
|---|---|---|---|---|
| 1,037,099 A * | 8/1912 | Lane | ........................... | 29/897.33 |
| 1,527,728 A * | 2/1925 | Arnstein | ........................ | 296/204 |
| 1,846,682 A | 2/1932 | Hammel | | |
| 1,870,914 A * | 8/1932 | Lane | ................................ | 52/292 |
| 3,034,209 A * | 5/1962 | Bianca et al. | .................. | 29/432 |
| 3,374,593 A * | 3/1968 | Rensch | ............................. | 52/283 |
| 4,218,859 A * | 8/1980 | Sams | ............................. | 52/194 |
| 4,646,505 A | 3/1987 | Paris | | |
| 4,893,445 A * | 1/1990 | Hefer et al. | ..................... | 52/234 |
| 7,392,624 B2 * | 7/2008 | Kinzer | ............................ | 52/194 |
| 2010/0242406 A1* | 9/2010 | Oliphant et al. | ................ | 52/846 |

FOREIGN PATENT DOCUMENTS

| | | |
|---|---|---|
| DE | 542902 | 1/1932 |
| DE | 1882171 | 11/1963 |
| DE | 8704779 | 5/1987 |
| DE | 10308176 A1 | 9/2004 |
| DE | 102005012817 A1 * | 9/2006 |
| EP | 1442807 A1 | 8/2004 |

OTHER PUBLICATIONS

Machine translation of the description of DE 10 2005 012 817 A1, Meiners, Willi.*
Machine translation of the claims of DE 10 2005 012 817 A1, Meiners, Willi.*

* cited by examiner

*Primary Examiner* — Joshua J Michener
*Assistant Examiner* — Elizabeth A Plummer
(74) *Attorney, Agent, or Firm* — Whitham Curtis Christofferson & Cook, PC

(57) ABSTRACT

Tower structures of wind power installations having a height of more than 80 meters have a mast structure with corner posts composed of sub-profiles. The corner posts are each formed a sub-profile A and a sub-profile I which are not integrally connected to one another. The sub-profiles together form a closed overall profile. Separating joints of the closed overall profile are arranged aligned with corresponding separating joints of an adjacent corner post which is connected to struts.

20 Claims, 5 Drawing Sheets

POLE CONSTRUCTION FOR FRAMEWORK TOWERS OF WIND POWER PLANTS

The invention relates to a mast structure for tower structures of wind power installations having a height of more than 80 meters with corner posts composed of sub-profiles, wherein the corner posts are each formed are formed from at least two sub-profiles comprising a sub-profile A and a sub-profile I which are not integrally connected to one another, wherein the sub-profiles together form a closed overall profile and separating joints of the closed overall profile are established such that they are arranged aligned with corresponding separating joints of closed overall profiles of an adjacent corner post which is connected to struts.

Angled profiles are generally used for the corner posts of framework tower structures. The load on the angled profiles increases with the height of the towers and with the size of the components mounted on the tower (for example wind power installations). To a certain extent, these loads can be coped with by the use of profiles with larger profile cross sections. However, the profile cross sections cannot be enlarged indefinitely, since production engineering constraints limit the manufacture of angled profiles.

DE 1 882 171 U correspondingly discloses a plurality of angled profiles being connected by welds, and a cruciform profile for corner posts being produced in the manufacturing state itself. This profile configuration is not optimal with respect to the achieved area moments of inertia of the corner post structure.

DE 103 08 176 A1 accordingly proposes corner posts being manufactured from molded steel whose profile has at least two flanks, wherein the flanks are connected by means of a support. A lattice tower constructed in this way offers the advantage that the profile of the corner posts is stronger because of the provision of an additional support. This results in corner posts whose kink length is considerably better than that of conventional corner posts manufactured from angled profiles.

A further possible way to produce high towers is to increase the number of corner posts, of which there are in general four, in order to comply with the static requirements. In this case, the limbs, which are connected by cross-struts, of the rectangular angled profiles which are generally used are no longer aligned approximately, as a result of which the connection of the struts, which fan out, is not parallel to the corresponding limbs of the angled profiles, and this is disadvantageous.

This problem is overcome by using corner posts composed of a plurality of sub-profiles, in general up to a total of four, thus increasing the cross-sectional area of the corner posts. However, this structural solution still comprises a structure with four corner posts.

One disadvantage is that the inertia radii, which are important for kink stability are very small since a large proportion of the cross-sectional area of the corner posts is located in the center of gravity area.

Many intermediate supports for the corner posts by means of struts are accordingly required, thus considerably increasing the design complexity.

Because of these problems, structures exist for framework towers in which corner posts and the fanning-out are formed from tubes. In this case, the material is concentrated in the profile of the corner posts and in the profile of the fanned-out areas in a statically optimum arrangement, well away from the neutral fiber of the profile. However, the connections of the fanned-out areas and the abutments of the corner posts in structures such as these are generally produced by welding processes. Welded connections are complex to manufacture.

Furthermore, weld beads have a high notch effect, which means that they must be overdesigned to a major extent, and are therefore virtually impossible to use, for dynamically loaded towers such as wind power installations.

Particularly against the background of new generations of wind power installations, whose hub heights are more than 80 meters and/or whose power is more than 2 Megawatts, new approaches have been developed for the design of the framework structure, because of the high static and dynamic loads on the tower structures.

EP 1 442 807 explains a corner-post profile which is optimized for use of material and assembly. In this case, a commercially available I-profile, which has a center web and flanges, and which profile is referred to in the specialist world by the expression "Peiner Traeger", is changed to a new shape after the rolling process for profile production, such that an angle of 90° is included between the flanges. The new profile produced in this way may in this case be open or closed. In the latter case, the flanges are welded to one another on the contact line.

This manufacture of the new profiles corresponding to EP 1 442 807 is complex, since a further manufacturing process is required after the rolling of the I-profile.

The advantage of the abovementioned structure over angled profiles is the large cross-sectional area which can be achieved with just one profile, and the inertia radius, which is greater than that of angled structures. The disadvantages are that the inertia radius is considerably less than that of a comparable tube (for example by a factor of 1.4), and that struts of the corner posts do not introduce the forces in the direction of the center of gravity of the profile, as a result of which the corner posts are twisted.

Another approach to produce corner posts with a closed profile is represented by the use, as disclosed in DE 102005012817 A1, of an octagonal profile which comprises two open sub-profiles—and is closed in the assembled state. The cross section of the assembled profile virtually corresponds to that of a tube. The sub-profiles are screwed. The struts are fitted by means of metal connecting sheets between the sub-profiles, such that forces that occur are introduced by the struts virtually centrally into the corner post which is formed by the screwed sub-profiles. The fitting of the metal connecting sheets results in a gap between the screwed sub-profiles. In order to ensure that the static characteristics of the assembled profile correspond to a closed profile, further screw connections may therefore be required, inter alia, on the sub-profiles between the struts. A spacing element is arranged on these additional screw connections between the sub-profiles, and is referred to as a tie plate. The required distance between the additional screw connections and therefore the number of tie plates required depends on the kink robustness of the profile halves with the reduced area moment of inertia.

Furthermore, the geometric conditions relating to the connection of the struts mean that the approximation of the corner-post profile to the statically advantageous tubular shape leads to sub-profiles with a very different area moment of inertia.

For example, in the case of a tower with four corner posts with the abovementioned structure, this results in an angle of about 270° for the outer metal sheet of the corner post. The corresponding result for the inner metal sheet is an angle of about 90°. This results in the inner metal sheet having a lower area moment of inertia than the outer metal sheet, thus resulting in a considerable number of additional screw connections and tie plates between the strut connections. Since the screw connections must be regularly checked, this results in corresponding costs, which depend on the number of tie plates that are used.

During the production of the profiles, it has also been found that it is complex, from the production engineering point of view, to manufacture closed octagonal profiles.

The object of the invention is to provide a structure of a corner post of a lattice mast in which the forces which are transmitted by the connected struts are introduced virtually centrally into the corner post, and wherein the corner post has a virtually identical area moment of inertia about both major axes, and the structure is simpler to manufacture than a structure composed of octagonal corner-post profiles, and in which the number of tie plates required between the sub-profiles of a corner post is minimized in comparison to the solution disclosed in DE 102005012817, and/or the material consumed for the corner posts of lattice mast structures is reduced.

The object is achieved by the mast structure having the features of claim 1. Advantageous refinements are described in the dependent claims.

For optimum use of material for the design configuration of overall profiles, it is of central importance that the forces transmitted by the struts be introduced centrally into the corner post and also that the minimum area moment of inertia of the overall profile be maximized. For closed overall profiles formed from sub-profiles, the minimum area moment of inertia of the overall profile is the fundamental principle for the dimensions. The sub-profiles likewise each have a maximum and a minimum area moment of inertia.

The fundamental idea of the solution is to use at least one sub-profile A and one sub-profile I for the structure of a corner post of a lattice mast, which, when assembled to form an overall profile, form a corner-post segment, and wherein an internal contour, which is formed by the connection of the three inner corner points of the overall profile, is virtually triangular in shape, and the external contour of the overall profile has connecting areas for metal connecting sheets, to which struts of the lattice masts are attached.

Surprisingly, the inertia radius and the kink robustness of a geometric cross section of the overall profile correspond approximately to those of a tube with the same cross-sectional area which, as is known, offers the possible optimum of kink robustness. The high level of robustness of the overall profile results inter alia substantially from the stiffening effect of the virtually rectangular angled connecting areas of the sub-profiles. Furthermore, the specific shape of the sub-profile I optimizes the minimum moment of inertia of the major axes of the profile.

The invention will be explained in more detail in the following text with reference to one particularly preferred embodiment of the invention, with the following drawings being attached for explanation:

FIG. 1: shows a partial section view of an overall profile with metal connecting sheets and struts;

Figure 1:
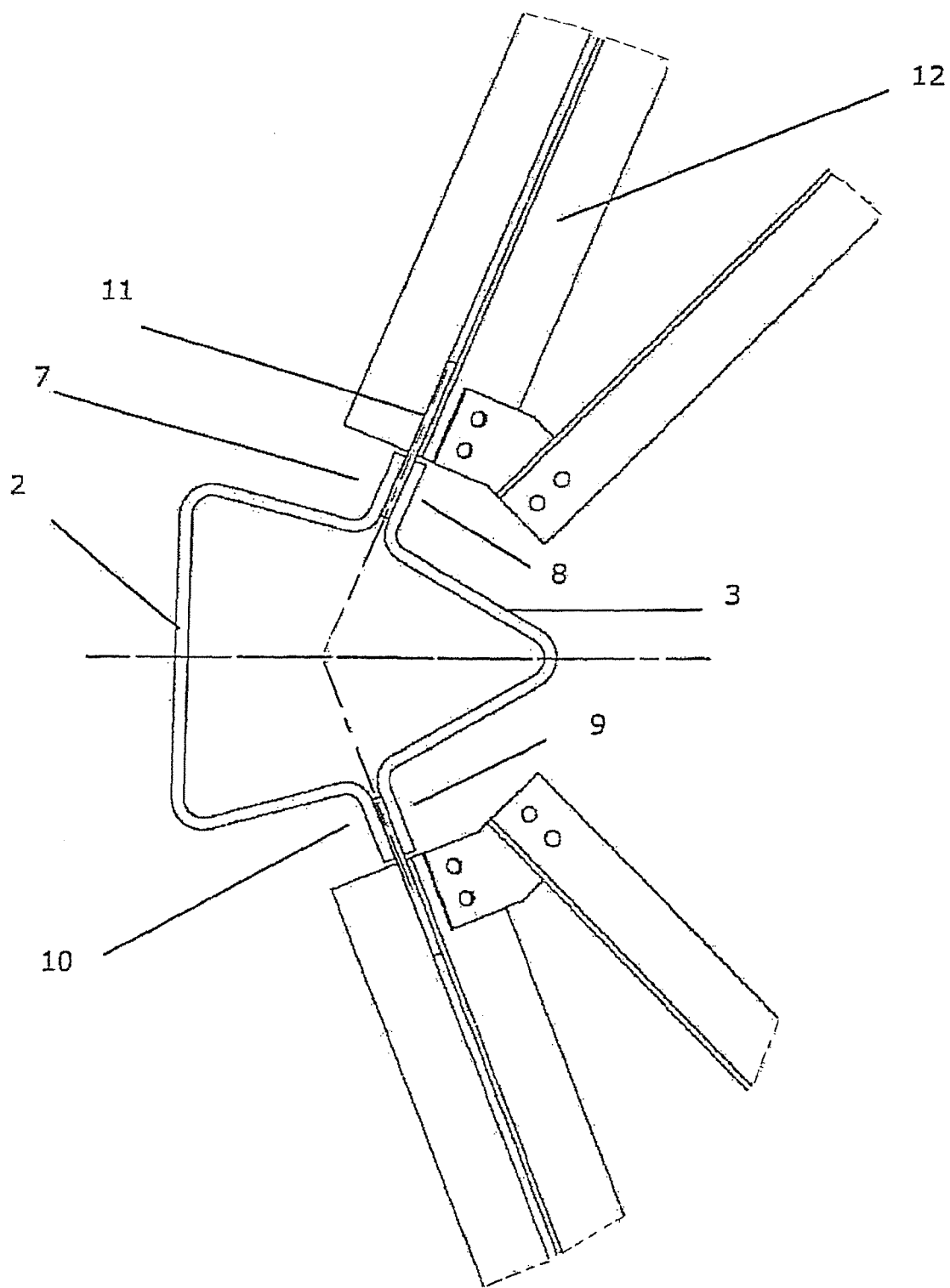

FIG. 1 shows an overall profile of a corner post 1 which is formed from a first sub-profile I 3 and a second sub-profile A 2, which are connected to one another in a non-integral form, for example by screw connections or rivets. As can be seen, the first sub-profile I 3 is angled once in the center piece, approximately in the center, over one longitudinal edge, and has connecting areas 8, 9 which are likewise angled, at the free ends, when seen in cross section.

The second sub-profile A 2 is angled twice in the center piece, that is to say over two longitudinal edges, and likewise has angled connecting areas 7, 10 on the mutually opposite free end edges.

Metal connecting sheets 11 for struts 12 are fitted in the junction points of the sub-profiles 2, 3 between the joined-together connecting areas 7, 8 and 9, 10, and connect the closed overall profiles of adjacent corner posts 1 to one another in order in this way to produce a framework tower structure.

Figure 2:
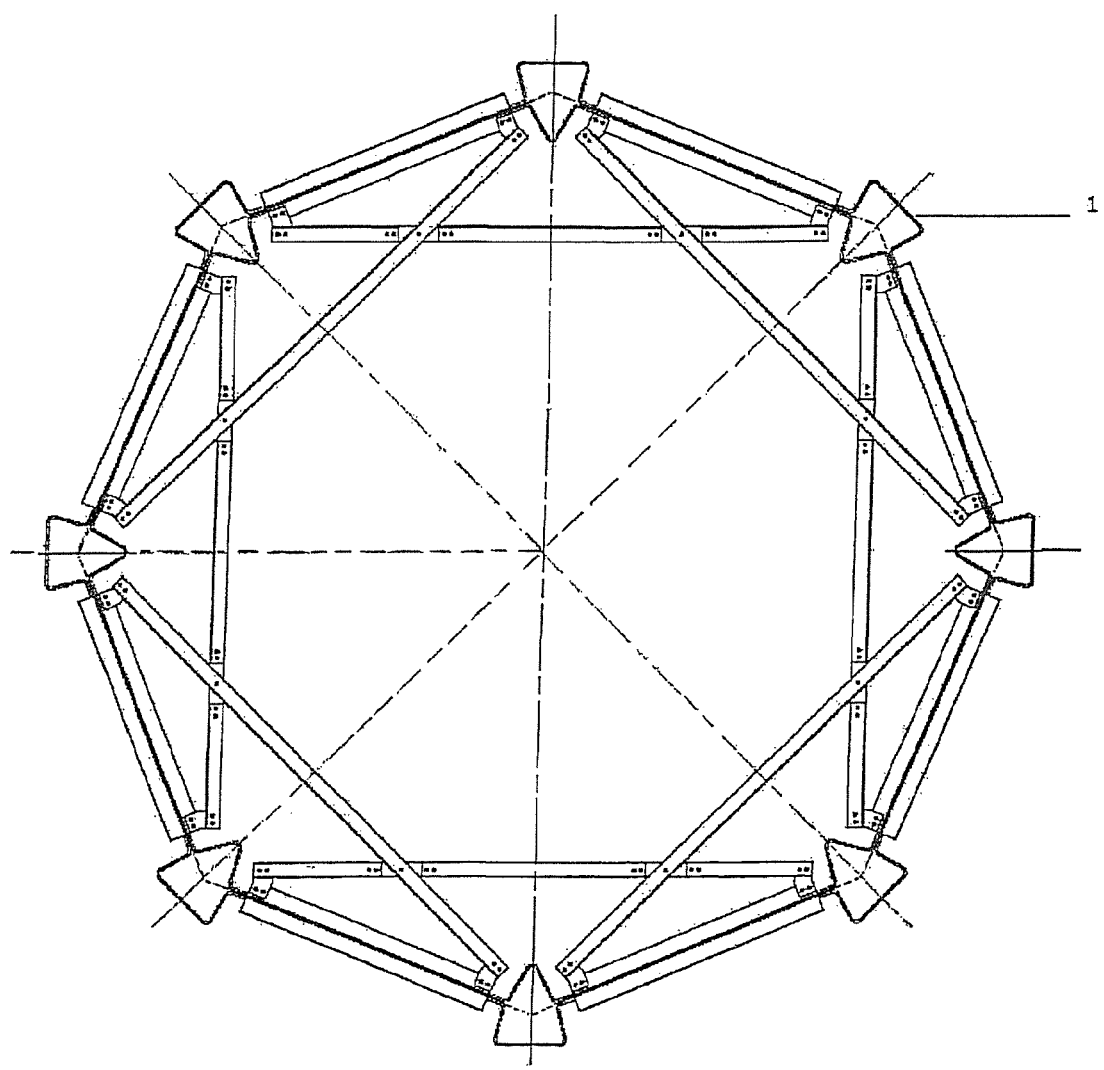
FIG. 2 shows a horizontal section through a tower structure with eight corner posts (schematically)
Figure 5:
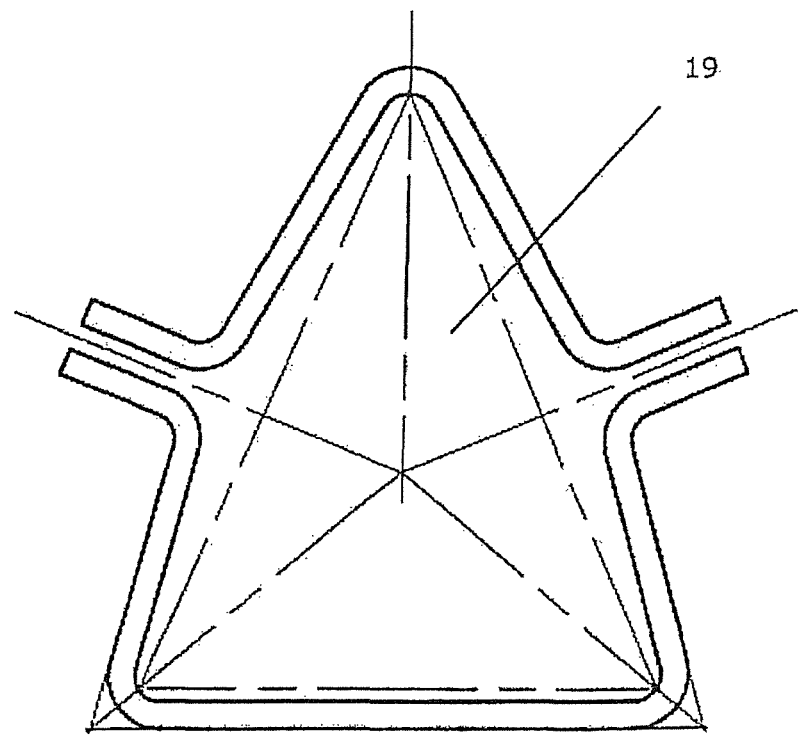
FIG. 5 shows a view of the overall profile with the internal contour of a triangle, which connects the angles alpha, beta and gamma.

In the exemplary embodiment according to the invention shown in FIG. 2, the lattice mast has eight corner posts. In the longitudinal direction, these corner posts comprise sub-profiles which are each formed from two preferably angled metal sheets. When the sub-profile I 3 is assembled with the sub-profile A 2, the overall profile created in this way has a cross section which corresponds virtually to that of a triangle, as can be seen in FIG. 5.

The structure is assembled by screw connections, preferably at the building site. In order to ensure accessibility to the screw connection on the profile hardness, hand holes which are not shown are provided in the sub-profiles. In general, these is therefore no need for any welding work.

For production-engineering reasons, particularly because of joined areas during the process of edging the sub-profile I 3, it is generally advantageous to make the angle alpha greater than 60°.

FIG. 2 shows the structure of a lattice mast with eight corner posts 1, and with the lattice mast having a height of 120 meters. A wind turbine with a power of 2 MW is intended to be arranged on the lattice mast.

Figure 3:
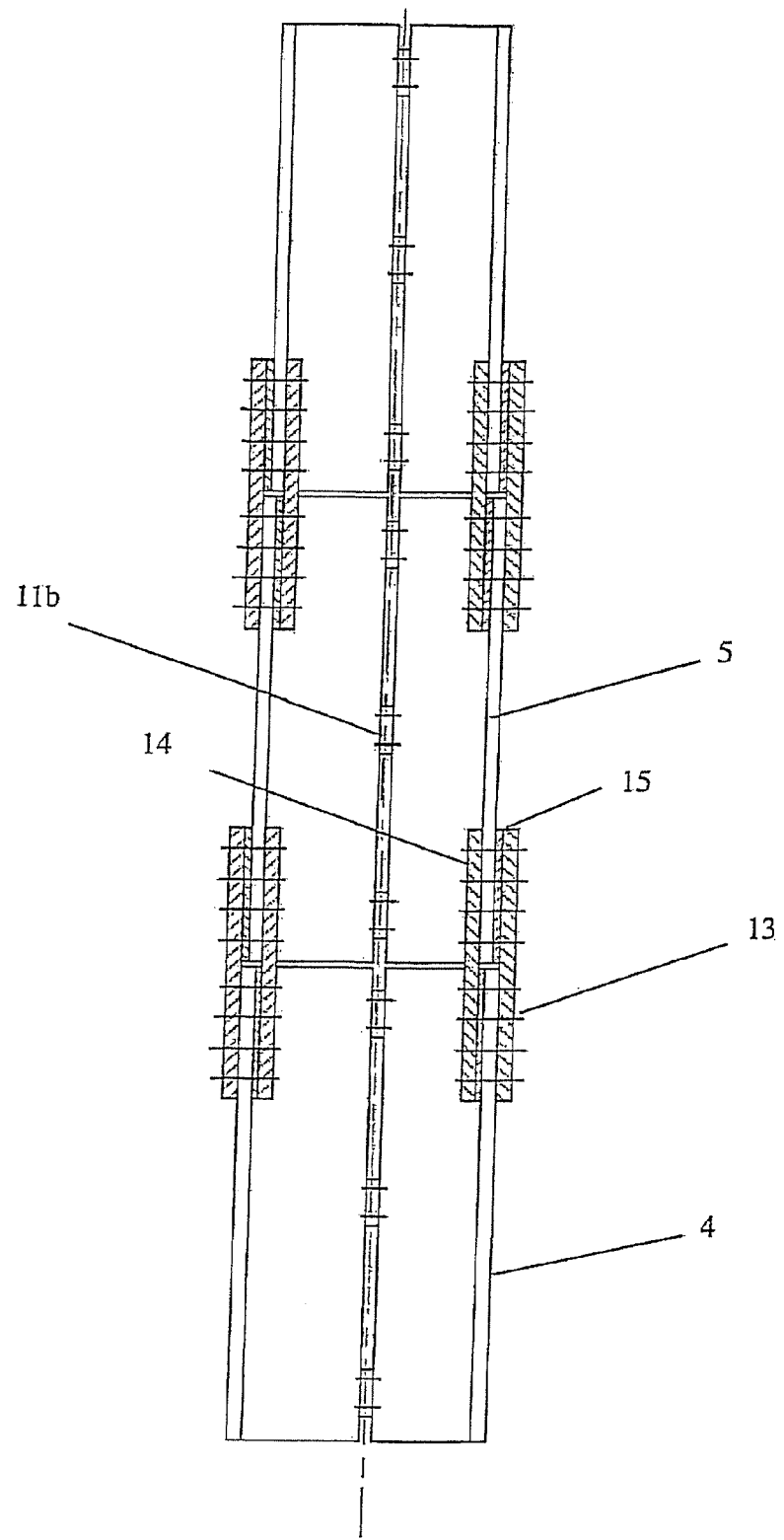
FIG. 3 shows a vertical arrangement of corner-post segments of a corner post which comprise overall profiles.

FIG. 3 shows a vertical arrangement of corner-post segments 4, 5, which are composed of overall profiles, of a corner post 1, wherein an upper segment 5 has a smaller cross section than a lower segment 4. The corner-post segments 4, 5 are connected to one another by means of butt plates 13, 15. In order to allow a force-fitting connection to be produced, for example by screw connections or riveting, distances between the vertically arranged overall profiles, which are screwed to butt plates 13, 14, can be compensated for by means of filler plates 15, which are placed between a corner-post segment 4, 5 and a butt plate 13, 14.

Tie plates 11b can be arranged on the connection between the sub-profiles.

Figure 4:
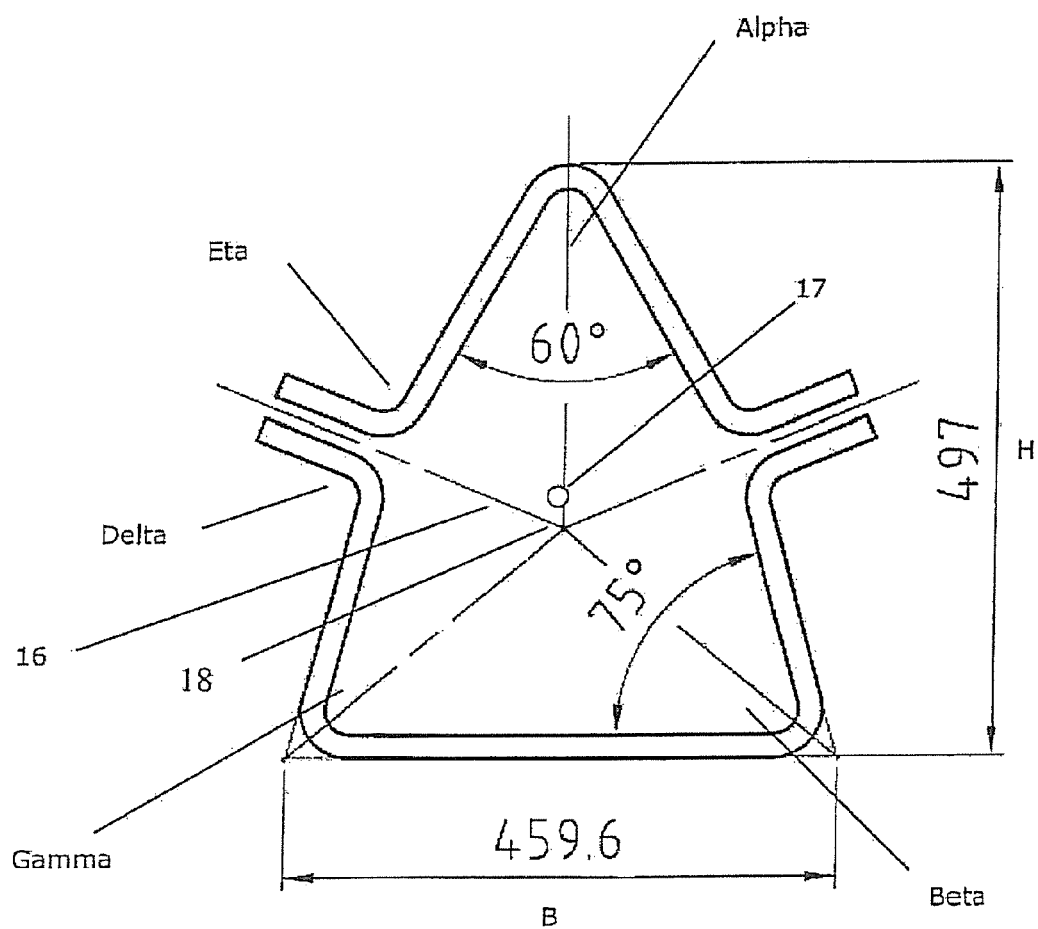
FIG. 4 shows an exemplary embodiment of an overall profile with a sub-profile A and a sub-profile I with connecting areas.

An overall profile as shown in FIG. 4 is used in the central height segment of the tower structure. The material used for the overall profiles is a Quality S 355 construction steel with a length of 12 meters and a material thickness of 14 millimeters. A profile height H of 497 millimeters and a profile width B of 459.6 millimeters results in the following area moments of inertia for the profiles according to the invention:

Sub-profile I
max=224438000 mm$^4$
min=67437500 mm$^4$
Sub-profile A
max=594600000 mm$^4$
min=204187000 mm$^4$
Overall Profile
max=825446000 mm$^4$
min=819038000 mm$^4$ In this case, the sub-profile I 3 has an angle alpha of 60°. The sub-profile A 2 has two angles beta and gamma of 75° each. The connecting areas of the sub-profiles 7, 8, 9, 10 are angled approximately at right angles, as a result of which the respectively opposite connecting areas 7 and 8 as well as 9 and 10 are aligned parallel to one another.

The angled connecting areas have a length which on the one hand allows assembly of the connecting pieces and on the other hand is designed to ensure the necessary stiffening of the profile.

The center of gravity 17 of the area moment of inertia is 16.93 mm above the intersection of the lines of symmetry 16.

One particularly advantageous aspect of this structure is that it results in the corner post having a virtually closed profile in the assembled state, with the area moments of inertia of the major axes being virtually identical.

The struts are connected to the overall profile via metal connecting sheets 11, which are arranged between the sub-profiles of the overall profile. The introduction of force, which is thus directed toward the center of the corner post, reduces bending moments and torsions on the corner posts in comparison to conventional corner-post structures, such as corner-post structures composed of angled iron.

The fitting of the metal connecting sheets 11 to the connection of the struts 12 results in a gap between the screw-connected sub-profiles.

In order to ensure that the static characteristics of the assembled profile correspond to those of a closed profile, further screw connection may, inter alia, therefore possibly also be required for the sub-profiles between the struts. Tie plates 11*b* are arranged at the additional screw connections between the sub-profiles.

The required distance between the additional screw connections and therefore the number of tie plates 11*b* required are less than in the case of corner-post structures composed of octagonal sub-profiles.

The overall profiles of the corner post form corner-post segments 4, 5. The corner-post segments 4, 5 are arranged in the vertical direction with respect to one another, and are connected by means of butt plates 13, 14. In general, the static and dynamic loads in higher segments of tower structures are lower than in lower segments of tower structures. One particularly advantageous refinement of the overall profiles is obtained by varying the material thickness and/or by varying the profile geometry, such as the width and the height of the triangular cross section of the overall profile. This makes it possible to minimize the amount of material consumed for the profile. In particular, in this context, the use of fine-grain construction steel is advantageous, since sub-profiles can in each case be manufactured from this steel exactly to match the static requirements.

This optimization in general results in higher segments of tower structures designed according to the invention having a smaller overall profile cross section than those in the lower segments. If this results in distances between the vertically arranged overall profiles which are screwed to butt plates 13, 14, filler plates 15 can be used, in order to allow a force-fitting connection, for example by screw connection.

According to the invention, the material thickness of lower corner-post segments is also less than the material thickness of upper corner-post segments. This is dependent, for example, on the respective spreading of the corner posts.

In a further advantageous refinement of the invention, at least some of the profiles are manufactured from non-metallic materials, for example laminated carbon fibers, in order to achieve weight savings and/or to reduce the material consumption of metallic construction materials.

The invention claimed is:

1. A lattice mast structure for framework towers of wind power installations having a height of more than 80 meters comprising:
   corner posts which are each formed from at least two sub-profiles comprising a first sub-profile and a second sub-profile which are not integrally connected to one another,
   wherein the first and second sub-profile together form a closed overall profile of a corner post of said corner posts having at least two connecting joints, whereby said connecting joints of the closed overall profile of the corner post are established such that said connecting joints are arranged aligned with one or more corresponding connecting joints of closed overall profiles of one or more adjacent corner posts and
   wherein the second sub-profile is angled in the cross section over a longitudinal edge with an angle alpha in a range of 50° and 70°, and the first sub-profile is angled in the cross section over two longitudinal edges with an angle beta and an angle gamma, each in a range of 60° to 90°, wherein the internal contour which is formed by the direct connection of the angles alpha, beta and gamma, of the assembled overall profile of the corner post that is triangular in shape and the sum of the angles alpha, beta and gamma are between 160° and 250°; and
   struts which are connected to the corner posts, wherein the struts and the corner posts are arranged in a lattice configuration to produce a framework tower structure, wherein the lattice configuration comprises one or more of the struts connecting non-adjacent corner posts.

2. The lattice mast structure as claimed in claim 1, wherein the first sub-profile and the second sub-profile have connecting areas which are angled at angles delta for the second sub-profile and eta for the first sub-profile such that the respectively opposite connecting areas are aligned parallel to one another, and the angle delta for the second sub-profile ranges from 80° to 110°, and the angle eta for the first sub-profile ranges from 80° to 110°.

3. The lattice mast structure of claim 2 wherein the first and second sub-profiles have connecting areas for connection of the first and second sub-profiles, and wherein the connecting areas for the connection of the first and second sub-profiles have a length which corresponds to 3 to 10 times a material thickness of the respective first or second sub-profile.

4. The lattice mast structure of claim 3 wherein connecting areas for connection of the first and second sub-profile have a length which corresponds to four times the material thickness of the respective first or second sub-profile.

5. The lattice mast structure of claim 2 wherein the angle eta for the second sub-profile is 97.5°.

6. The lattice mast structure as claimed in claim 1, wherein the first and second sub-profiles have connecting areas for connection of the first and second sub-profiles, and wherein the connecting areas have a length which corresponds to 3 to 10 times a material thickness of the respective first or second sub-profile.

7. The lattice mast structure of claim 6 wherein connecting areas for connection of the first and second sub-profile have a length which corresponds to four times the material thickness of the respective first or second sub-profile.

8. The lattice mast structure as claimed in claim 1, wherein the overall profile of the corner post in a fitted state has an approximately equal area moment of inertia about both major axes of the overall profile.

9. The lattice mast structure as claimed in claim 1, the lattice mast structure comprising longitudinal axes, wherein the longitudinal axes meet at one point on the struts, wherein the struts are connected at one height to an overall profile of a corner post, and the center of gravity of the overall profile is located at a radius of 0 to 40 mm around the one point.

10. The lattice mast structure of claim 9, wherein the center of gravity of the overall profile is located at a radius of 20 mm around the one point.

11. The lattice mast structure as claimed in claim 1, wherein the corner posts comprise lower corner post segments and at least one corner post segment arranged above the lower corner post segments, wherein lower corner post segments of the mast structure have sub-profiles with a different material thickness than the at least one corner post segment which is arranged above the lower corner post segments.

12. The lattice mast structure as claimed in claim 1, wherein at least one of the first and second sub-profiles of a corner post of the corner posts is composed of the fine-grain steel.

13. The lattice mast structure as claimed in claim 1, wherein one or more of the first and second sub-profiles and the struts are composed at least partially of non-metallic materials.

14. The lattice mast structure as claimed in claim 13, wherein at least one of the first and second sub-profiles are formed at least partially from natural materials containing fibers.

15. The lattice mast structure as claimed in claim 13 wherein the struts are composed at least partially of non-metallic materials.

16. The lattice mast structure as claimed in claim 13 wherein the first and second sub-profiles are composed at least partially of non-metallic materials.

17. The lattice mast structure as claimed in claim 1 wherein the struts are formed at least partially from natural materials containing fibers.

18. The lattice mast structure of claim 1 wherein the sum of angles alpha, beta, and gamma are 210°.

19. The lattice mast structure of claim 1, wherein the lattice configuration comprises at least one strut which crosses a second strut.

20. A lattice mast structure for framework towers of wind power installations having a height of more than 80 meters comprising:
    corner posts which are each formed from at least two sub-profiles comprising a first sub-profile and a second sub-profile which are not integrally connected to one another,
    wherein the first and second sub-profile together form a closed overall profile of a corner post of said corner posts having at least two connecting joints, whereby said connecting joints of the closed overall profile of the corner post are established such that said connecting joints are arranged aligned with one or more corresponding connecting joints of closed overall profiles of one or more adjacent corner posts and
    wherein the second sub-profile is angled in the cross section over a longitudinal edge with an angle alpha in a range of 50° and 70°, and the first sub-profile is angled in the cross section over two longitudinal edges with an angle beta and an angle gamma, each in a range of 60° to 90°, wherein the internal contour which is formed by the direct connection of the angles alpha, beta and gamma, of the assembled overall profile of the corner post that is triangular in shape and the sum of the angles alpha, beta and gamma are between 160° and 250°; and
    struts which are connected to the corner posts, wherein the struts and the corner posts are arranged in a lattice configuration to produce a framework tower structure, wherein the lattice configuration comprises one or more of square and diamond elements from a view of a horizontal section through a framework tower.

* * * * *